United States Patent
Dachs

(10) Patent No.: US 8,006,189 B2
(45) Date of Patent: Aug. 23, 2011

(54) SYSTEM AND METHOD FOR WEB BASED COLLABORATION USING DIGITAL MEDIA

(76) Inventor: Eric B. Dachs, San Francisco, CA (US)

( * ) Notice: Subject to any disclaimer, the term of this patent is extended or adjusted under 35 U.S.C. 154(b) by 775 days.

(21) Appl. No.: 11/821,276

(22) Filed: Jun. 21, 2007

(65) Prior Publication Data

US 2008/0010601 A1 Jan. 10, 2008

Related U.S. Application Data

(60) Provisional application No. 60/815,968, filed on Jun. 22, 2006.

(51) Int. Cl.
*G06F 3/00* (2006.01)
(52) U.S. Cl. ......... 715/751; 715/716; 715/719; 715/723
(58) Field of Classification Search .................. 715/716, 715/719, 723, 751
See application file for complete search history.

(56) References Cited

U.S. PATENT DOCUMENTS

| | | | |
|---|---|---|---|
| 5,671,428 A * | 9/1997 | Muranaga et al. ............ | 715/751 |
| 6,366,914 B1 | 4/2002 | Stern | |
| 6,598,074 B1 * | 7/2003 | Moller et al. ................. | 709/204 |
| 6,654,757 B1 | 11/2003 | Stern | |
| 6,789,109 B2 | 9/2004 | Samra et al. | |
| 6,957,186 B1 | 10/2005 | Guheen et al. | |
| 7,013,290 B2 | 3/2006 | Ananian | |
| 7,143,357 B1 * | 11/2006 | Snibbe et al. ................. | 715/751 |
| 7,660,416 B1 * | 2/2010 | Kline ............................ | 380/216 |
| 2001/0040592 A1 | 11/2001 | Foreman et al. | |
| 2001/0052001 A1 | 12/2001 | Stern | |
| 2002/0015050 A1 | 2/2002 | Kawai et al. | |
| 2003/0033325 A1 | 2/2003 | Boogaard | |
| 2003/0060910 A1 * | 3/2003 | Williams et al. ................ | 700/91 |
| 2003/0090711 A1 | 5/2003 | Yoshii et al. | |
| 2003/0146915 A1 | 8/2003 | Brook et al. | |
| 2003/0208469 A1 | 11/2003 | Stern | |
| 2003/0225641 A1 | 12/2003 | Gritzmacher et al. | |
| 2004/0004665 A1 | 1/2004 | Kashiwa | |

(Continued)

FOREIGN PATENT DOCUMENTS

WO 0150668 A2 7/2001

(Continued)

OTHER PUBLICATIONS

Seo, "Intercreative Cinema: Collaborative Expression with Digital Video", Sep. 2001.*

(Continued)

*Primary Examiner* — Tuyetlien T Tran
(74) *Attorney, Agent, or Firm* — Nixon Peabody LLP

(57) ABSTRACT

A system and method configured to allow production team members to view, organize and manage production of a motion picture. The system and method allows the production team members to organize the project script; extract the script into scenes and slates; view, organize, select and collaborate on uploaded digital media and takes for each scene as well as uploaded audio, music or special effects that are to be applied to the product. The system tracks versions of the project by monitoring each change as well. The system also allows production member to organize project calendars, tasks associated with projects, contacts, notes, budgeting and other facets of the project. The system incorporates security measures which allow certain members of the production team to only have access to designated high-security material.

9 Claims, 7 Drawing Sheets

U.S. PATENT DOCUMENTS

| | | |
|---|---|---|
| 2004/0015427 A1 | 1/2004 | Camelio |
| 2004/0054725 A1* | 3/2004 | Moller et al. ............. 709/204 |
| 2004/0071441 A1 | 4/2004 | Foreman et al. |
| 2004/0133919 A1 | 7/2004 | Incentis |
| 2004/0139474 A1 | 7/2004 | Carro |
| 2004/0199578 A1 | 10/2004 | Kapczynski et al. |
| 2005/0010874 A1* | 1/2005 | Moder et al. ............. 715/751 |
| 2005/0060362 A1 | 3/2005 | Wolinsky et al. |
| 2005/0068462 A1 | 3/2005 | Harris et al. |
| 2005/0071736 A1 | 3/2005 | Schneider et al. |
| 2005/0084082 A1* | 4/2005 | Horvitz et al. ........ 379/114.06 |
| 2005/0163462 A1 | 7/2005 | Pratt et al. |
| 2005/0165840 A1 | 7/2005 | Pratt et al. |
| 2005/0173864 A1* | 8/2005 | Zhao ............................ 273/299 |
| 2005/0187806 A1 | 8/2005 | Wurtzel et al. |
| 2005/0235199 A1 | 10/2005 | Adams |
| 2005/0254776 A1 | 11/2005 | Morrison et al. |
| 2006/0015904 A1 | 1/2006 | Marcus |
| 2006/0047547 A1 | 3/2006 | Ekker et al. |
| 2006/0047698 A1 | 3/2006 | Fox |
| 2006/0064633 A1 | 3/2006 | Adams |
| 2006/0064644 A1* | 3/2006 | Joo ............................. 715/751 |
| 2006/0064731 A1 | 3/2006 | Kahle et al. |
| 2006/0069926 A1 | 3/2006 | Ginter et al. |
| 2006/0076423 A1 | 4/2006 | Silverbrook et al. |
| 2006/0161867 A1* | 7/2006 | Drucker et al. ............ 715/810 |
| 2006/0184673 A1* | 8/2006 | Liebman ..................... 709/225 |
| 2006/0218476 A1* | 9/2006 | Gombert ..................... 715/500 |
| 2006/0294467 A1* | 12/2006 | Auterinen .................... 715/723 |
| 2007/0067482 A1* | 3/2007 | Johnson et al. ............. 709/231 |
| 2007/0118801 A1* | 5/2007 | Harshbarger et al. ........ 715/730 |
| 2007/0162854 A1* | 7/2007 | Kikinis ....................... 715/719 |
| 2007/0239839 A1* | 10/2007 | Buday et al. ............... 709/208 |
| 2007/0277101 A1* | 11/2007 | Barber et al. ................ 715/539 |
| 2007/0282614 A1* | 12/2007 | Dreke ................................ 705/1 |
| 2009/0196570 A1* | 8/2009 | Dudas et al. ..................... 386/52 |

FOREIGN PATENT DOCUMENTS

| | | | |
|---|---|---|---|
| WO | 0152526 | A3 | 7/2001 |

OTHER PUBLICATIONS

International Search Report and Written Opinion, Application No. PCT/US2007/014635, dated Feb. 20, 2008.

* cited by examiner

CONTINUED: 10

The SOUND of SUDDEN MOVEMENT. Peter's flashlight clicks
on and finds Mueller's chair, now empty, then redirects,
moving toward the lamp. Just as it arrives, there's a SHARP BLOW. A GASP. The
flashlight drops to the platform. Then the flashlight is switched off.

BLACK SCREEN

The absolute silence of death. Seconds pass. Then
12 — BARELY AUDIBLE SOUNDS in the distance. Perhaps voices.
And then, with the suddenness of an onrushing locomotive, the darkness
comes alive with sound:
16 — VOICES, LAUGHTER, PUBLIC ADDRESS ANNOUNCEMENTS, all on
top of one another, all too loud and somehow grating. Among the sounds AIRPORT P.A. (V.O.)
                        Lufthansa announces the immediate
                        departure of flight 964. Final
                        boarding is now underway at Gate 15.

A VOICE (V.O.)
                        Medical transport this way
                        please.

SECOND VOICE (V.O.)
                        Tickets.

THIRD VOICE (V.O.)
                        I'll need the patient's passport..

SLOW FADE IN:

14 — SERIES OF DISTORTED IMAGES

Light overtakes darkness. All is shrouded in thick fogs,
as if viewed throuh a film of Vaseline. Movement. The interior of an airliner. A stewardess.
An IV bag hangs overhead. A glimpse of a white medical uniform. But then DARKNESS RETURN as:
                        PILOT (V.O.)
                        Flight attendants, prepare for departure LIGHT AGAIN. Blue sky overhead -- and the hanging IV
bag. The rear door of an ambulance swings open. A
youthful FACE appears.
                                  THE FACE ~18
18
                        Comfortable?

Fig. 3

SYSTEM AND METHOD FOR WEB BASED COLLABORATION USING DIGITAL MEDIA

STATEMENT OF RELATED APPLICATION(S)

The present application claims the benefit of priority based on U.S. Provisional Patent Application Ser. No. 60/815,968 filed on Jun. 22, 2006, in the name of Eric B. Dachs, entitled "System and Method for Web Based Collaboration of Digital Media", all commonly owned herewith.

TECHNICAL FIELD

The subject matter described herein relates to a system and method for web-based collaboration and project management using digital media over a network.

BACKGROUND

Motion pictures or other content such as movies, short films, television shows, commercials and music videos, are produced over an extended time and involves a vast amount of communication, time and collaboration to reach a final product. The emergence and improvements in computer hardware and software as well as the commercial viability of the Internet and quick upload and download times have provided the ability for people around the world to communicate with one another.

What is needed is a system and method which allows persons to efficiently and conveniently manage, produce and collaborate on a motion picture or other digital media project.

BRIEF DESCRIPTION

A system and method to allow motion picture and other content production team members to view and organize the project script; extract the script into scenes, slates and takes. The system and method allows production team members to view, organize, select and collaborate on uploaded shots and takes for each scene as well as communicate regarding uploaded audio, music or special effects that are to be applied to the motion picture. The system also tracks versions of the project by monitoring each change and allows production members to organize project calendars, tasks associated with projects, contacts, notes, budgeting and other facets of the project.

BRIEF DESCRIPTION OF THE DRAWINGS

The accompanying drawings, which are incorporated into and constitute a part of this specification, illustrate one or more embodiments and, together with the detailed description, serve to explain the principles and implementations of the system and method.

In the drawings:

FIG. 3 illustrates a screen shot of a script tool of the system in accordance with an embodiment.

DETAILED DESCRIPTION

Figure 1:
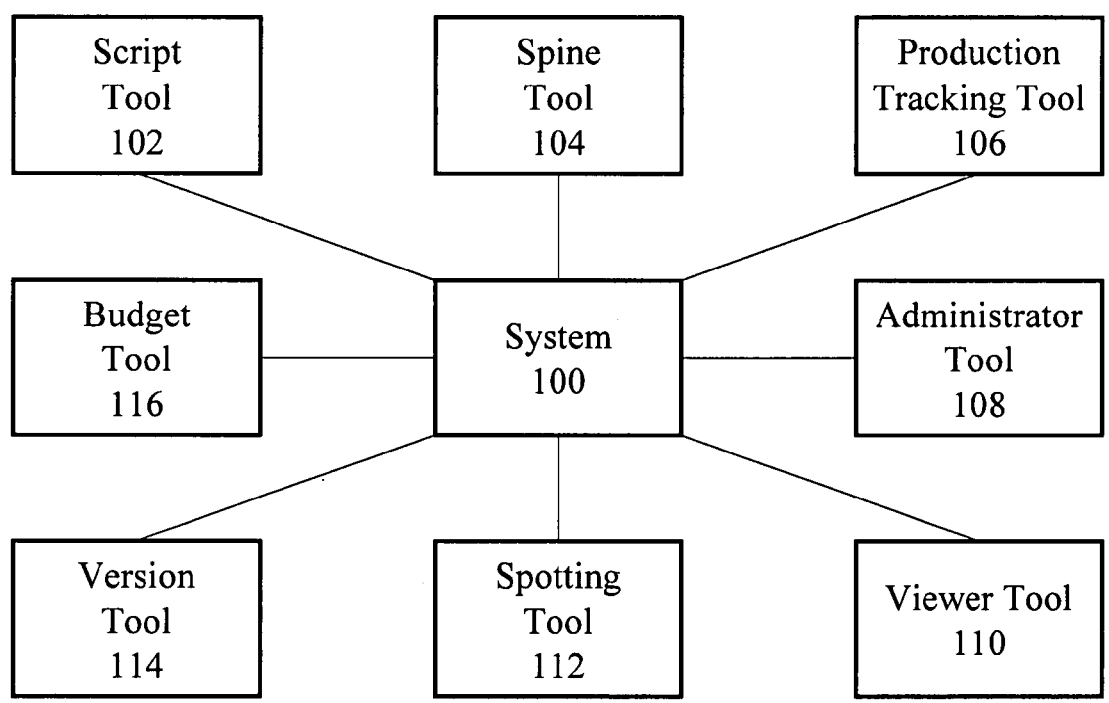
FIG. 1 illustrates a block diagram of the system in accordance with an embodiment.

Embodiments are described herein in the context of a system of computers, servers, and software. Those of ordinary skill in the art will realize that the following detailed description is illustrative only and is not intended to be in any way limiting. Other embodiments will readily suggest themselves to such skilled persons having the benefit of this disclosure. Reference will now be made in detail to implementations of the present system and method as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. It is understood that the phrase "an embodiment" encompasses more than one embodiment and is thus not limited to only one embodiment. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

For purposes of the description, the term "motion picture" is used herein to generally describe the digital content which is organized and utilized in producing a finished work, whether the finished work is a full length movie, short film, television show, commercial, music video, video game, skit, play, performance, promotional work, animated work, and/or other content involving a video component. The process of making a motion picture involves a substantial amount of work in the pre-production, production, and post-production stages. In pre-production, a script may be generated, whereby the script serves as the backbone or structure upon which the motion picture is based. The script may include, among other things, concepts, designs, wardrobes, settings, locations, characters, dialogue, sequences and most importantly, the story. One aspect of pre-production involves a series of sketches or stills which serve to provide an overall look and feel of what each scene will generally look like in the motion picture. It is from the script that the scenes are set up, slated and shot. Although the script may slightly change during the course of production of a motion picture, the script serves as the backbone of the film. Typically, the producers, directors, editors as well as the rest of the production team strictly follow the script from beginning to the end in making the motion picture. It is during the pre-production phase that the film is "set up", and a substantial amount of collaboration is present between members of the production team to get the project ready to move ahead to the production phase.

The production phase of the project usually takes the longest time to complete in the course of making the motion picture. The production phase includes setting up the scenes; slating the scenes; and shooting the scenes, many times with multiple takes. It is during the production phase that the film is "formed." Thus, the members of the production team continue to collaborate in getting the project onto the final phase of the project; post-production.

The post-production process includes further editing, applying voice-overs to dialogue in the scenes; adding video and audio effects; adding music sequences; applying color correction and lighting; and final editing. The decision as to which takes and shots are to be in the final product occurs in the production stage as well as the post-production stage. After the motion picture is released or broadcast to be viewed by the audience, follow up actions are taken such as providing bonus features and commentaries for DVDs and other after market products.

The system and method is directed to a powerful and robust tool which allows members of the production team to quickly and efficiently perform the tasks necessary in pre-production, production and post-production. The system can be used for a project from inception of the script to the final editing phase. The system may be used to collaborate and manage only one project at a time or multiple projects occurring simultaneously. In general, the system allows production team members to view and organize a script; extract the script into scenes and slates; view and collaborate on shots and takes for each scene as well as communicate to one another regarding audio, music or special effects applied to the motion picture. The system tracks versions of the project by tracking each change as well. The system also allows production member to organize project calendars, tasks associated with projects, contacts, notes, budgeting and other facets of the project.

FIG. 1 illustrates a block diagram of the system in accordance with an embodiment. As shown in FIG. 1 the system 100 includes a script tool 102, an organizer tool 104, a production tracking tool 106, an administrator tool 108, a viewer tool 110, a spotting tool 112, a version tool 114, and a budget tool 116. It should be noted that the system 100 may include additional and/or other components which would be useful in the production of a motion picture project, such as, for example, an editing tool.

The script tool 102 organizes and categorizes the script into sections upon which the motion picture is organized. The organizer tool 104 is a tool which categorizes and organizes the script as well as stored media files in a manner which the scenes, slates, takes and shots are based. The production tracking tool 106 enables management of one or more pending projects by providing the user with the necessary information to track the progress of the project and evaluate yet to-be-completed items. The administrator tool 108 provides the administrative functions which are used to create and maintain user accounts, set up and manage access and security, generate reports and manage files. The viewer tool 110 provides a user interface which displays video and audio as well as allows collaboration and communication among production team members. The spotting tool 112 allows dialogue, voice-overs, sound effects and music to be added to the chosen scenes, takes and shots. The version tool 114 and budget tool 116 provide version and budget information of items in a project.

Figure 2:
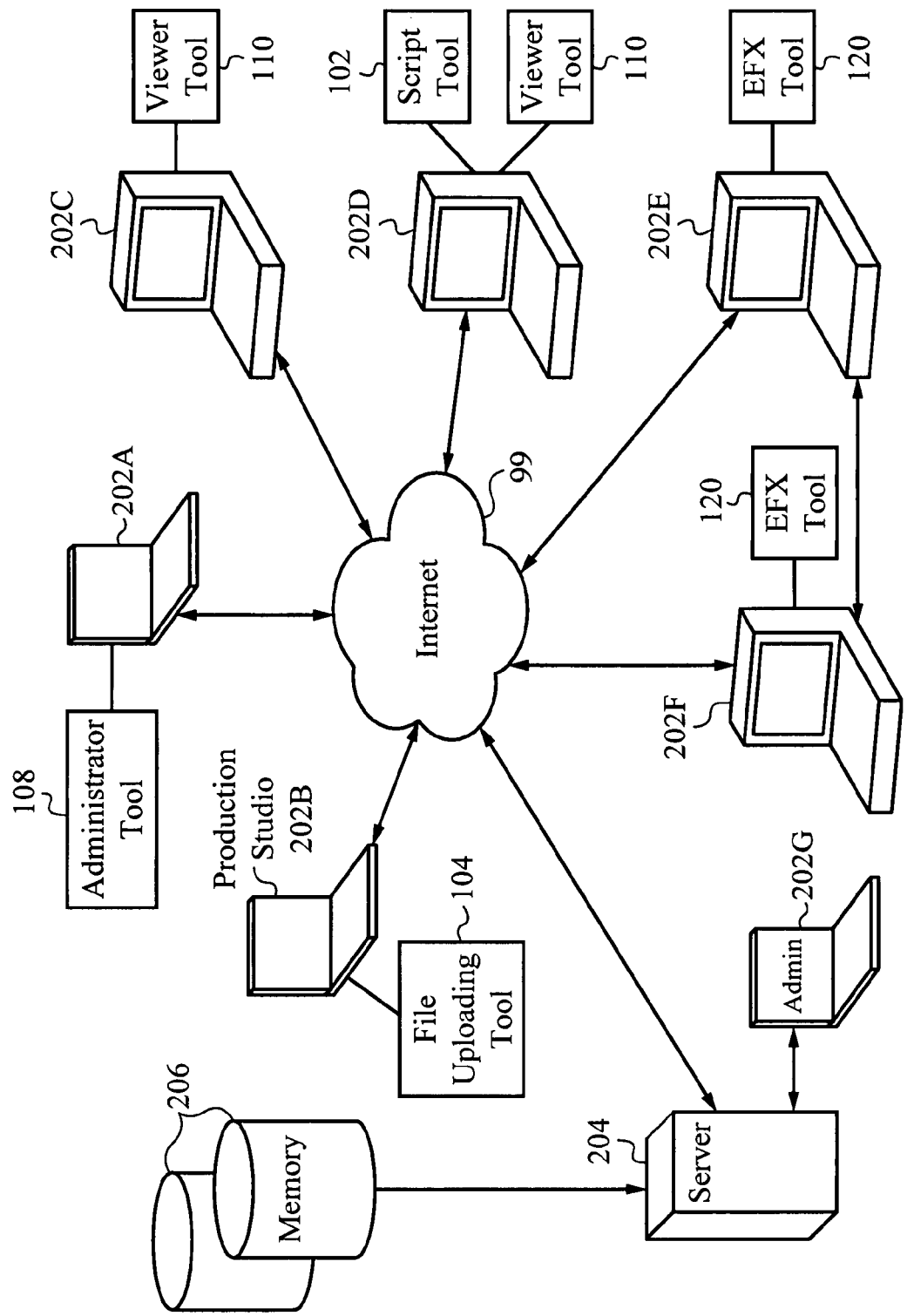
FIG. 2 illustrates a schematic diagram of the system architecture in accordance with an embodiment.

FIG. 2 illustrates an overall architecture in which the system 100 in accordance with an embodiment. The system is configured to allow one or more production team members at multiple remote locations to input, view, and modify (if given permission) data as well as collaborate with others in the production of the motion picture. The various tools of the system are software modules which allow the user to manage the features of the system 100. In an embodiment, the system 100 is modular and is created using an object oriented programming language to allow easy and efficient system modifications and updates.

As shown in FIG. 2, several computer terminals 202 are connected to the system 100 via the Internet 99. Alternatively or additionally, a wired local area network (LAN), wireless local area network (WLAN) serves to connect the computer terminals 202 to the system 100. The system software resides on the server 204 in an embodiment. In an embodiment, data related to the operation of the system is stored on memory storage area modules 206 which are located on the server 204 and/or remote from the server 204. In an embodiment, data files relating to the content are uploaded onto the server 204 and stored in the memory 206. In another embodiment, data files relating to the content are uploaded and kept on a computer terminal 202B at the production studio (e.g. editor's studio), whereby the data files are accessed through the terminal 202B at the studio.

In an embodiment, the system can be used offline on a single computer or can be used by multiple users on multiple systems over a private or public network. In an embodiment, the system can operate in a decentralized fashion utilizing an ad-hoc network of peer computer systems. In this fashion, content and media can be delivered peer-to-peer by one client to another. No one particular computer system may contain all project information, but collectively all information is retained on one or more computers. A degree of redundancy can be included so that project and content availability is not impacted by changing network or computer conditions.

In an embodiment, all network operations are secured by security hardware and software, in addition to internal private addressing schemes and multiple domain structure for increased security. Point to point communication may be encrypted over a Virtual Private Network (VPN) with private addressing on both ends. The tools may be isolated into individual domains to enhance security. The system may include one or more firewall and packet filters for enhanced security.

The system 100 may include security features which prevent tampering or unauthorized viewing of the content of the project in an embodiment. In an embodiment, each person using the system is assigned a security clearance rating which gives the person access to some or all of the features and/or content in the system, depending on his or her rating. In addition, one or more of the system's interactive features (e.g. script tool, production tool, etc.) may have an access rating assigned to it such that only those users having a matching security clearance rating or higher may access the features. In addition, content which is uploaded or already stored in the system may have a same or different access rating assigned to it to allow viewing of the content to those who have security clearance of that assigned rating or higher. The entire content may receive one access rating or each file containing content may be selectively assigned same or different access ratings. In an embodiment, the administrator (or person having a predetermined security clearance) of the system or of a particular project may assign the access ratings to the features, content and/or users. In an embodiment, the security feature tracks and analyzes each individual tool's operations and monitors system performance to ensure that the system is not hacked.

As shown in FIG. 2, the system is accessed via the Internet in an embodiment, whereby multiple users may access same or different features of the system 100 at the same time or different times. For example, as shown in FIG. 2, terminals 202A and 202G are shown accessing the administrator tool 108, terminal 202C is shown accessing the viewer tool 110, terminal 202D is shown accessing the script tool 102 and the viewer tool 110, terminals 202E and 202F are shown accessing the EFX tool 120. In an embodiment, the system 100 updates all data input into the system automatically to allow any modifications, notes and/or messages to be seen by one or more users in real time when accessing the system at the same time. The system thereby allows users or different groups of users to collaborate in real time on different levels simultaneously. Again, as stated above, the system is alternatively a peer to peer network in which data is shared among computers which are not necessarily linked to one or more central servers.

The system 100 includes a script tool 102 in accordance with an embodiment. The script tool 102 organizes and categorizes the script into sections upon which the motion picture is organized. The script for a motion picture serves as the structure upon which the scenes, slates, locations, dialogue, camera angles, characters, and all other information upon which the motion picture is based and organized. Although the script tool 102 may be a powerful feature of the system 100, it is an optional tool. For example, the production team may use a paper version of the script and manually generate the scenes, set ups and slates in the script tool 102 which are eventually used by the system in producing the motion picture.

In an embodiment, the script tool 102 allows the script to be imported into the system 100. In particular, the script may be on paper and then scanned into the system, whereby optical character recognition (OCR) software converts the scanned document into an appropriate format for the system 100. In an embodiment, the imported script may be able to be edited in the organizer tool 104 using a word processing program. Alternatively, the script is read-only not editable, and is thus placed on the system only for viewing. In an embodiment, the script is directly typed into the system using a word processing program. It is contemplated that the script for a particular project may evolve or portions be rewritten over the course of the project. Thus, the system may store multiple versions and/or drafts of the script for later viewing.

FIG. 3 illustrates a script imported into the script tool 102 of the system 100. A script in general includes dialogue, location settings, visual and/or audio descriptions of events as well as camera effects, character names, designation of visual and/or audio effects, and other information. In an embodiment, system 100 allows the user to link the script in the script tool 102 to any or all of the other tools of the system 100. Thus, the script tool 102 allows the user to view all the information associated with a selected portion of the script, from an entire scene to a particular word in the script.

In particular, as shown in FIG. 3, the script tool 102 allows the user (e.g. the director, producer) to select and link any portion of the script to the organizer tool 104 and/or any other tools of the system 100. For example, the portion of the script in FIG. 3 which states SERIES OF DISTORTED IMAGES 14 may be "marked" or assigned to be hyper-linked to the corresponding scene in the organizer tool 104. Upon being marked, the system allows the user to move the cursor on the computer display screen to SERIES OF DISTORTED IMAGES and click on the marked phrase. In an embodiment, the system 100 will then automatically navigate the user to the script tool 102, whereby the user will be able to view the script tool 102 and see the associated information which has been entered in regards to Scene 2. For instance, the system may allow the user to navigate from the script tool 102 to the viewer tool 110 to see all the shots associated with Scene 2 in the script bins as well as notes, comments or other information, discussed below. In an embodiment, the system 100 allows the user to navigate from the script tool 102 to the spotting tool 112 to listen to dialogue, sound effects, music score, or other audio which may be incorporated into the particular scene. For example, the user is able to individually click on the SUDDEN MOVEMENT 10, BARELY AUDIBLE SOUNDS 12 and/or VOICE, LAUGHTER, PUBLIC ADDRESS ANNOUNCEMENTS 16 links in the script tool 102 shown in FIG. 3. The system 100 then automatically navigates the user to the spotting tool 112 to listen to one or more audio clips associated with the selected link which had been created by the production team (e.g. sound effects studio). The system 100 allows the user to then navigate back to the script tool 102 to view other portions of the script.

The script tool 102 is able to also link portions of the scripts to other portions of information not directly related to the scene, such as actor bios and contact information and/or the equipment rental company which will need to be contacted to handle the shot, take or scene which corresponds to the marked phrase. For example, the word FACE 18 may be linked to the actor who's face will appear in the motion picture for that scene. Thus, upon selecting FACE, the system may automatically display the actor, her biography, her and her agent's contact information as well as any other information which may pertain to the particular scene in the script (e.g. equipment rental company, etc).

In marking portions of the script to be linked, the script tool 102 allows the user to highlight one or more words in the script by any appropriate method (e.g. click and drag; point and select; search query, etc). Once the one or more words are selected, the user is able to select a marking tool from a menu in the system 100, whereby the menu provides the user all of the destination tools where the selected item(s) may be linked to. The user then selects one or more of the desired destination tools (e.g. script tool, viewer tool, spotting tool, etc). The system 100 then creates a hyperlink for the selected word(s) and places the hyperlink between each of the selected destination tools and the selected phrase. It is also possible to mark the portions of the script from another tool in the system 100. For example, a user viewing a particular scene in the viewer tool 110 may assign that scene or portions of the dialogue to the script directly from the viewer tool. This allows the user to easily mark the script without having to go to the script tool. Hyperlink creation and management is known in the art and not discussed in detail herein.

In an embodiment, the script tool 102 allows a portion of the script that is already marked to be further marked to different destinations. For example, as shown in FIG. 3, the portion of the script that is designated with reference numeral 2 is already marked and is linked to the viewer tool. The script tool 102 allows the visual description SERIES OF DISTORTED IMAGES 14 to be further marked and linked only to the spotting tool 112, for example. Thus, upon selecting on the SERIES OF DISTORTED IMAGES 14 phrase, the system will navigate the user to the spotting tool 112. However, the script tool 102 may be configured to provide the user the option to navigate to the viewer tool 110 to see the SERIES OF DISTORTED IMAGES 14 when clicking on the marked paragraph having the reference numeral 2.

In an embodiment, once the user selects the linked word(s), the user is requested to select which of the destination tools he or she would like to navigate to. In another embodiment, the system 100 navigates the user to a common page (not shown) which displays all of the destination tools where more information of the marked word(s) may be found. It should be noted that although linking of the script to video and/or audio is described herein, the system is configured to allow the user to link any two or more items together such that relevant or related information is kept together to aid in collaboration. One example is to link characters to the scenes in which they appear or linking a PDF to an event on the calendar. Generally, linking is used to relate items together but can be used for other purposes like creating shortcuts instead of hyperlinking.

The system 100 includes the organizer tool 104 in accordance with an embodiment. As stated above, the organizer tool 104 allows the user to categorize content associated with the motion picture. In particular, the user utilizes the organizer tool 104 to designate content into bins, whereby the bins may be organized based on the script and/or a general outline upon which the motion picture is to be based. In particular, the bins are organized by scene, slate, take, shot, etc. to correspond with the direction or story of the motion picture, The bins are configured to be linked to one or more stored media content files, whereby selecting a particular bin will provide video, audio and text associated with each the designated scene, slate, take and/or shot for that bin. For instance, by selecting a bin associated with a particular scene, the user is able to view all or selected media files designated with that scene. As discussed below, the organizer tool 104 provides a reconfigurable and scalable tree of the entire motion picture which allows the production team to break down the motion picture into easily manageable categorized portions, whereby each categorized portion provides the production team members all the necessary information to effectively collaborate, plan and execute that portion.

Figure 4:
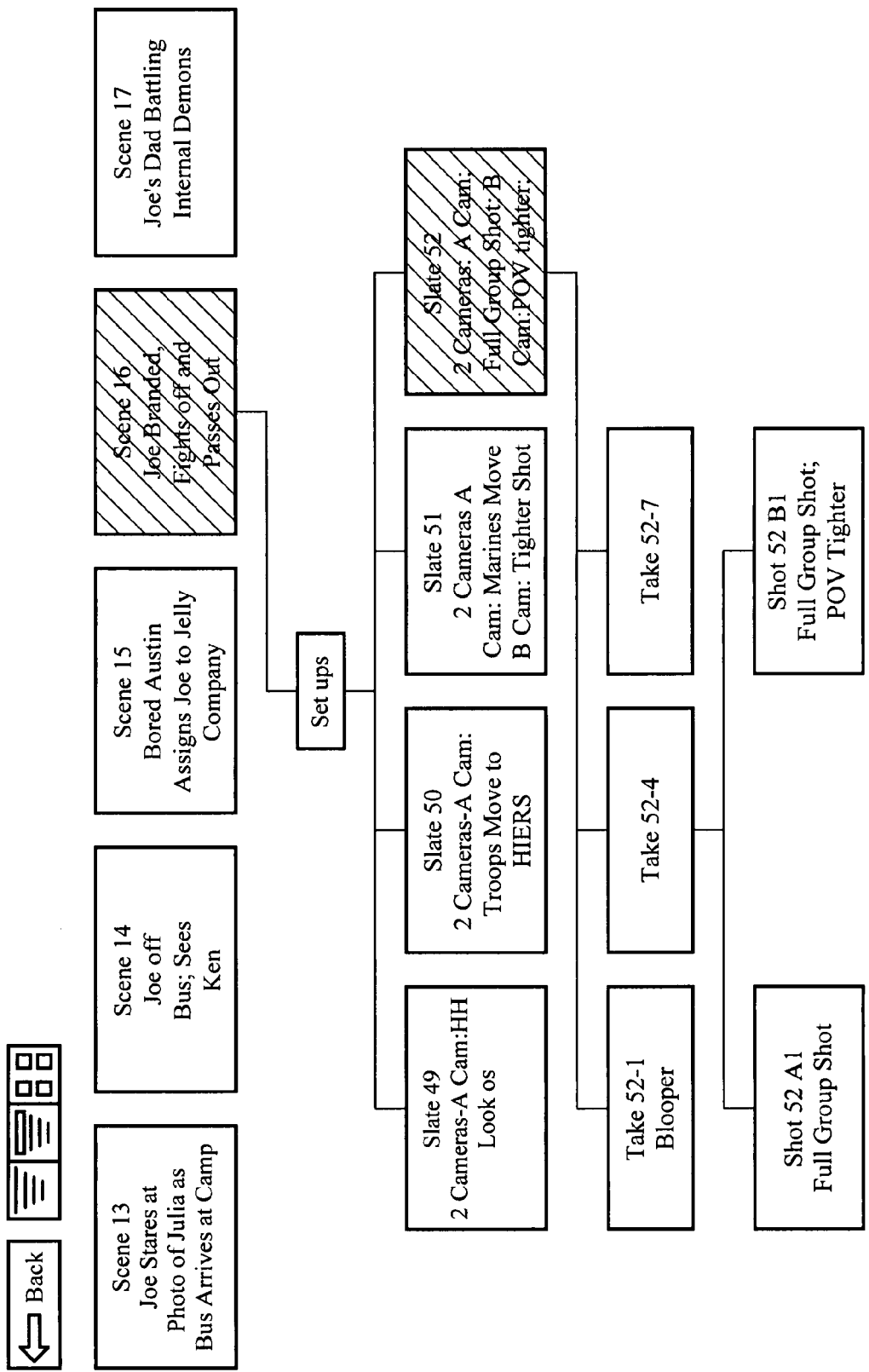
FIG. 4 illustrates a schematic of the script tool of the system in accordance with an embodiment.

FIG. 4 illustrates a sample screen shot of the organizer tool 104 in accordance with an embodiment. As shown in FIG. 4, the organizer tool 104 displays several scene tabs, each of which is associated with a particular bin. The scene tabs are shown in FIG. 4 ranging from Scene 13 to Scene 17. The scene tabs may include a brief description of the scene, which may be entered manually into the system or may imported from the script tool 102. Alternatively, the scene tabs do not contain any description therein. In an embodiment, each scene bin, once selected, displays one or more slates associated with the scene bin.

As shown in FIG. 4, the Scene 16 bin has been selected, whereby Scene 16 includes several slate tabs having Slates 49-52. Each slate tab is associated to a corresponding slate bin and may include a brief description of the slate, as shown in FIG. 4. This description in each slate tab may be manually entered into the system or may imported from the script tool 102. Alternatively, the slate tabs do not contain any description therein. Each slate bin, once selected, displays one or more takes associated with that slate bin.

As shown in FIG. 4, Slate bin 52 is shown to be selected, whereby Slate bin 52 includes several Takes bin tabs having Takes bins 52-1, 52-4 and 52-7. Each Take bin tab is associated with a corresponding Take bin and may include a brief description of the Take, as shown in FIG. 4. Alternatively, the Take tabs do not contain any description therein. Each Take bin tab, once selected, displays one or more shots associated with the take.

As shown in FIG. 4, Take bin 52-4 is selected, whereby Take bin 52-4 includes Shot Tabs 52-A1 and 52-B1. Each Shot Tab is associated with a corresponding Shot Bin and may include a brief description of the shot, as shown in FIG. 4. This description in each Shot tab may be manually entered into the system or may imported from the script tool 102. Alternatively, the Shot tabs do not contain any description therein. Each Shot tab, once selected, displays all pertinent data that is associated with the shot. Such data may be carried over from information originally entered in the scene tab (Scene 16), although not necessarily. Such information may include, but is not limited to, video and/or audio clips of the shot, contact information of the actors in the shot, notes, sound and/or visual effects, production budgets, still shots of the scene, location information and other types of information which would be beneficial for the production member. This information may be manually entered or may be imported into the system. In an embodiment, a hyperlink may be included to navigate the user to the script tool 102 to view the portion of the script which refers to the particular scene/shot.

The content bins are selectively organizeable in an embodiment. In particular, the organizer tool 104 is configured to allow the user to move the bins and thereby reorganize the structure of the Scenes, Slates, Takes and Shots in any desired manner. For example, the Scene tabs may can be moved to change the order of where a particular scene is to be located with respect to the other scenes. Thus, Scene 15 in FIG. 4 may be moved to be in between Scenes 13 and 14 by clicking Scene Tab 15 and dragging it between Scenes Tabs 13 and 14. In an embodiment, the movement of the scene tab is noted by the system, whereby the system displays that the scene (e.g. Scene 15) was originally and/or previously between Scenes 13 and 14. In an embodiment, the system is accordingly updated to reflect the change by making a note on the organizer tool 104, version tool 114 and/or by actually moving the text of the script associated with the Scene 15 to be between the text associated with Scenes 13 and 14. In an embodiment, the system automatically updates the numbering so that Scene Tab 15 is renumbered to become Scene Tab 14 when moved to the position after Scene Tab 13.

Figure 5:
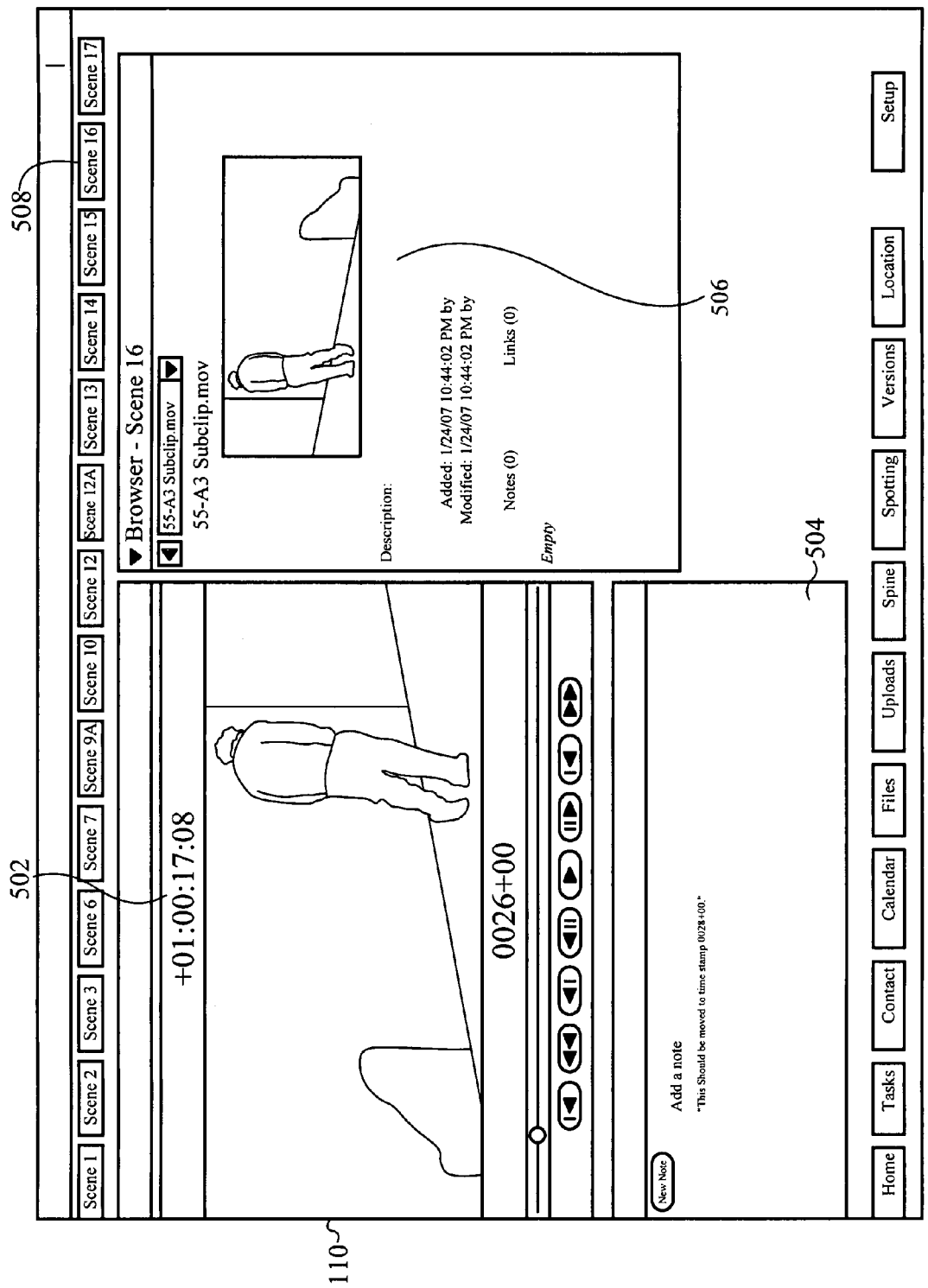
FIG. 5 illustrates a screen shot of the script tool of the system in accordance with an embodiment.

In an embodiment, the user may simply click on a Scene bin in the organizer tool 104 to access all information (e.g. content for all slates, shots, takes) regarding that particular scene at once. In another embodiment, as described above, the user may select a Scene bin and be directed stepwise to a narrower approach of the information in the Scene bin (e.g. view only the available slates in the scene bin). For example, as shown in FIG. 5, upon clicking on Scene Tab 16, the user is able to view a vast array of information that is associated to that particular scene. For example, the user is able to view all the Slates, Takes and Shots associated with Scene 16 using the viewer tool 110 as shown in FIG. 5. The organizer tool 104 shown in FIG. 5 incorporates the viewer tool 110 wherein the user can view video clips, audio clips, graphical and/or textual information assigned to that particular scene. The organizer tool 104 thereby allows the user to easily view, comment on and/or select the takes or shots for each scene by merely selecting the particular Scene tab.

In an embodiment, as shown in FIG. 5, the viewer tool 110 is associated with the organizer tool 104 and allows one or more members of the production team to view and collaborate on content in a selected bin, In an embodiment, the viewer tool 110 includes a primary workspace section 502, a Notes Section 504, a secondary workspace section 506, and a scene selector section 508. The video in the primary workspace section 502 is preferably associated with the selected scene (Scene 16 in FIG. 5), although other video or audio content is contemplated. The user is alternatively able to view a still shot, sketch, personnel contact information, the script, notes, or other appropriate information in the area. It should be noted that although the layout of the viewer tool has a particular configuration in FIG. 5, it may have another configuration or layout and is thus not limited thereto.

The secondary workspace 506 shown in FIG. 5 is capable of displaying any or all the material that is displayable in the primary workspace 502. The secondary workspace may be smaller in size to the primary workspace 502, although the user can dynamically customize the secondary workspace 506 to be equal or greater in size compared to the primary workspace 502. In an embodiment, the secondary workspace 506 is used to provide additional information to the user while the user is viewing a movie clip or other data.

In an embodiment, the user is able to view video files in separate video players in the primary and secondary workspaces 502, 506. For example, the video clips of different takes may be compared in the primary and secondary workspaces. For example the shown in FIG. 5, a particular take may show the subject from one camera angle in the primary workspace 502, whereas a different camera angle from the same take is displayed in the secondary workspace 506. In an embodiment, the timing of the clips in the primary and secondary workspaces are synchronized so that the user is able to view the differences between the two synchronized clips. In an embodiment, a take from one scene may be played in the video player in the primary workspace 502 while another take from the same scene is played within the video player in the secondary workspace 506 or vice versa. For instance, the primary workspace can display a scene where the actor waves with his right hand whereas the user plays a file in the secondary workspace of a different take in which the subject is waving with his left hand. This allows the user to compare the different takes to determine which to use in the cut. In an embodiment, the secondary workspace 506 may also display a list of files associated with the particular scene, whereby the files are from a drop-down menu indicated by reference 510. The user is able to select a file in the list to view it on the primary workspace 502 and/or secondary workspace 506. In an embodiment, the secondary workspace 506 may display the script in the script tool 102 while audio and/or video is played back in the primary workspace 502. The system may highlight portions of the script as the video and/or audio is played in the primary workspace to allow the user to compare the script with what was actually shot in the take. This would require the video and/or audio to be synchronized with the script via a timestamp or other synchronizing method.

In the Notes section 504, users can post messages to be shared with all the users who have access to the organizer tool 104 or to one or more particular users who have access to the organizer tool 104. The notes posted may be directed to suggestions or feedback regarding the scene or any other related matter, although not necessarily. As shown in FIG. 5, the Notes section states that the particular moment in the scene should be moved to timestamp 0028+00 The notes may be stored on each user's account, server, or a local computer, whereby the user can remove or highlight one or more notes without affecting the notes on another user's Notes Section. In an embodiment, the notes are uploaded and displayed periodically, although the notes may be updated in real time.

In an embodiment, the user can choose the preferred as well as alternative slates, takes and shots for each scene in a sneak preview mode. In the sneak preview mode, the system 100 may then play back the entire motion picture from beginning to end by playing the selected digital audio and video files of the preferred slates, takes, and shots in the order of the scenes (i.e. Scene 1, then Scene 2, then Scene 3, etc.). The system 100 may have a feature to play back the entire or a portion of the motion picture from beginning to end by playing the selected digital audio and video files with selected alternative slates, takes or shots. This allows the user to compare two different versions of the motion picture as a whole. In an embodiment, the system may allow the user to switch between the preferred and an alternate (or vice versa) shots at any time while the system 100 plays back in the sneak preview mode. In an embodiment, the system may allow the viewer to view two or more versions of the motion picture simultaneously to allow the viewer to compare the versions.

In an embodiment, digital media is uploaded to the system directly from the movie studio. In an embodiment, digital media is uploaded from members of the production staff and outside sources. The system also is capable of downloading the digital media to diskette, compact disk, flash drives, servers and/or portable or non-portable media playback devices. The digital media files may be stored in a memory on the server 204 or in a separate memory 206, whereby the files in the memory are able to be easily retrieved from the client terminal. In another embodiment, the digital media files are stored on the client application, whereby the system will upload the file automatically or at a designed time. In an embodiment, peer to peer file sharing is performed between terminals for a particular project, whereby the system tracks the source and destinations computers which are sharing the digital file. The digital video files are uploaded in any appropriate format (e.g. avi, mpeg, H.264, etc.). Audio files are uploaded or streamed in an appropriate format as well (mp3, mp4, wav, wma, asx, ACC, it etc).

Upon uploading the files to the system 100, the system 100 prompts the user as to where the uploaded file is accessible on the system 100. In particular, the system 100 will request whether the file being uploaded is to be a video clip that will be in the motion picture, and if so, which scene, slate, take and shot the clip is to be located in. Upon the user designating the destination of the file, the system 100 stores the file and places a link to the file at the proper location on the system browser.

Figure 6:
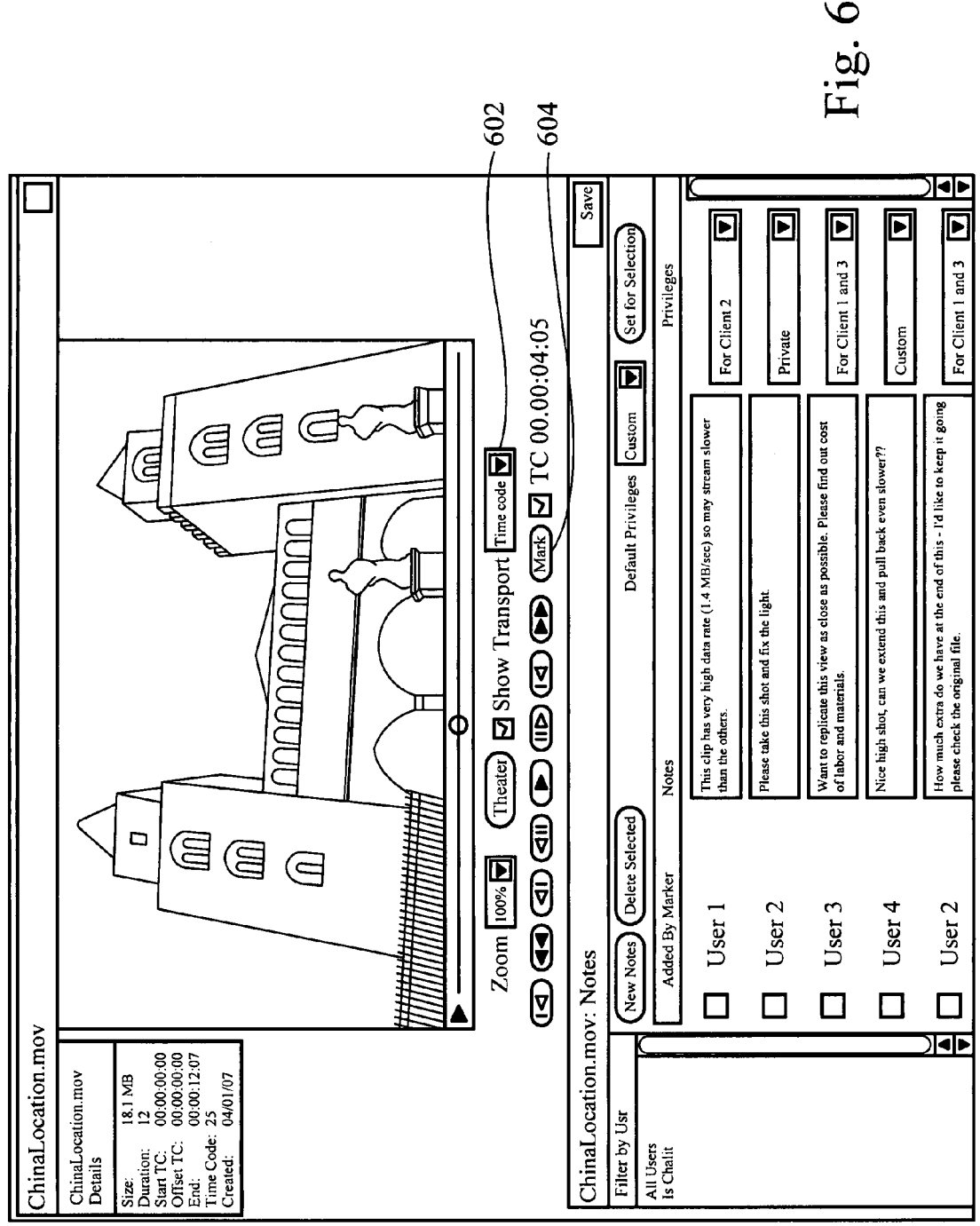
FIG. 6 illustrates a screen shot of a viewer tool of the system in accordance with an embodiment.

FIG. 6 illustrates a screen shot of another type of layout of the viewer tool 110 in accordance with an embodiment. The viewer tool 110 allows for posting of content for approval and revision requests, whereby members of the production team can view and approve or request revisions quickly and conveniently. The viewer tool 110 may display still shots, video, concept art, storyboards, animatics, motion capture files, models, animation files, audio, and/or other content. The viewer tool 110 is configured to handle the format of the digital content for proper playback.

For video, the viewer tool provides the time code (TC) of the content during playback in an embodiment. The time coded material may be presented by the viewer tool 110 in SMPTE format or FF format. In an embodiment, the viewer tool 110 allows the user to place a marker on the playback of the video (or audio), whereby the marker corresponds to the time code content. The marker allows members of the production team to comment on an exact point of content and communicate exactly where in the playback the comment applies. A marker icon (or the actual time stamp) is displayed next to the note in an embodiment. A person reading the note can then select the marker, whereby the viewer tool 110 will playback the content from that exact time stamp.

As shown in FIG. 6, the bottom portion of the viewer tool shows a screen that a user might use to place a note to another person. As stated, the note may be posted as in a bulletin board or may be sent as a message. The viewer tool 110 may be a stand alone tool, as shown in FIG. 6.

As discussed above, the system 100 includes a spotting tool 112 in accordance with an embodiment. The spotting tool 112 allows dialogue, voice-overs, sound effects and music to be added to the chosen scenes, takes and shots. Dialogue and music may be added at anytime during the production of the motion picture, although dialogue, voiceovers, and music are usually applied in post-production. The audio files are uploaded onto the system 100 by one or more members of the production team, although any other persons may upload the data as well. The uploaded audio files can be linked to the marked time stamp discussed above, whereby playback of the video will automatically playback the audio from the spotting tool 112 in synchronization. The spotting tool 112 allows one or more users to make notes, and thus comment, on the audio files. As with the video, the audio files may be time stamped as well, whereby the time stamp corresponds with the time stamp of the video and/or has a separate time stamp of its own. Therefore, a person can separately mark (and comment) on the audio file in context of the video as well as a portion of the audio file itself.

Referring back to FIG. 1, the system 100 includes a version tool 114 in an embodiment, The version tool displays the versions of the project, the tasks, scenes set up, the script, digital and audio files as well as who requested the revision, when the revision was requested, and what the status is of the revision. It is also possible for a user to enter notes about the revision for review by others. These notes can be used for follow up by the production team members.

Figure 7:
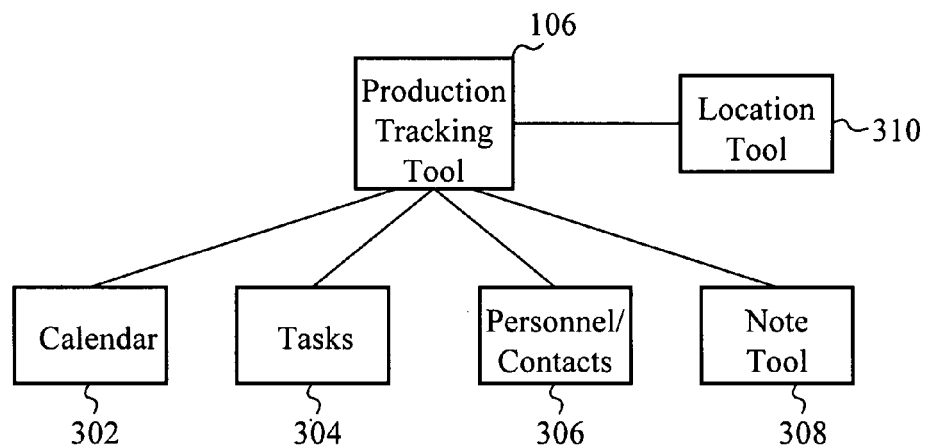
FIG. 7 illustrates a block diagram of a production tracking tool of the system in accordance with an embodiment.

FIG. 7 illustrates a block diagram of the production tracking tool 106 in accordance with an embodiment. As shown in FIG. 7, the production tracking tool 106 enables the management of one or more pending projects by providing the user with the necessary information to track the progress of the project and evaluate yet to-be-completed items. The production tracking tool 106 may be configured to present a one page summary of current, past and future production status information. In an embodiment, the production tracking tool 106 includes a calendar tool 302, a task assignment tool 304, a personnel/contacts tool 306, a note tool 308, and a location tool 310. It should be noted that the production tracking tool 106 may include additional and/or other components which would be useful in the management of a motion picture project. This information, defined herein as profile information, can be linked to the scenes, takes, shots and/or slates, such that the profile information is automatically displayed to the user when reviewing that particular scene, take, shot and/or slate.

The system 100 stores the project status information in a database which may be accessed, viewed and/or modified (by authorized users). The production tracking tool 106 allows viewing of the current status of the project, or project history. Every item involved in the project ("production item") in the database may be accessed by search regarding its current status. As each production item is created by members of the production team, it is stored in the system's memory. The items added to the system may be required to be approved by one or more other members of the production team before it is stored.

The calendar 302 in FIG. 7 allows the creation and maintenance of the production schedule of the project. In an embodiment, certain projects in the production of a motion pictures may be broken down and categorized further into sub-projects. These sub-projects may be organized and tracked using the production tracking tool 100. The calendar may provide information in timeline, calendar or other view for both past, ongoing and future tasks. The information in the calendar is able to be updated in real-time to allow members of the production team to view the status of the project. The calendar tool 302 may be configured to automatically notify one or more persons regarding a schedule change. In an embodiment, the calendar tool 302 can display additional information that is not event-based, such as files, contact information, notes, or other profile information as discussed herein. Some examples include placing characters, locations, and script elements on days or weeks for easy access. The calendar tool 302 thus allows items to be placed directly on the calendar versus simply displaying events with items linked to them.

The production tracking tool 106 includes a task tool 304, as shown in FIG. 7. The task tool allows one to view past, current and future assignments. The task tool 304 may be configured to assign a particular task to one or more persons, whereby the persons are automatically notified of their assignments. The task tool 304 allows pertinent information to be input including, but not limited to, amount of time to complete the task, desired due date, budgeted cost of performing the task (in terms of cost of labor and materials), etc. Other tasks may be arranged to be dependent on the particular task, whereby the assigned person cannot receive the necessary information to complete any future tasks until the current assigned task is completed. The task tool 304 may include a feature which calculates the amount of time needed to complete several tasks for the assigned person to create an acceptable workload for the person. The task tool 304 may be configured to interface with the calendar 302 to identify any scheduling conflicts. The task tool 304 may configured to interface with the budget tool 116 (FIG. 1) to provide cost information for each task. In an embodiment, the task tool 304 can be configured to include one or more "playlists" which is a group or a series of items in a particular order. The system allows one or more playlists to be sent from one user to another, irrespective of security controls placed on the items in the playlists, whereby the playlist includes a number of tasks and profile information (e.g. images, sounds, video clips, zip archives, pdf documents) in a particular order, such that the receiving person can execute the tasks in the given order to make completing the task easier and more efficient.

The personnel/contacts tool 306 shown in FIG. 7 allows the members of the production team to view contact information of all persons who are or may be involved in the project, although not necessarily. Such persons include actors, directors, producers, production engineers, staff, vendors, etc. Specific information as well as multimedia data may be included for each contact in the contact list. For example, digital clips of prior movies which have been done by a particular actor may be included in the actor's profile in the contacts tool 306. This particular feature may allow members of the production team to preview the type of role that the particular actor may be best served in (e.g. support actors, stunt doubles, etc.)

The note tool 308 shown in FIG. 7 allows for communication between persons on the production team regarding the project. The note tool 308 facilitates collaboration regarding the project by allowing the users to effectively communicate to one another regarding particular scenes, slates, takes, as well as shots (or aspects thereof) so that necessary adjustments or changes may be made efficiently and quickly, as discussed more below. The note tool 308 may take the form of postings (such as on a bulletin board), although the note tool 308 may include features like instant messaging, email, fax, Internet calls, etc. In an embodiment, the note tool 308 includes verifiable transmission of the note and reception by the intended recipient of the note. The notes are editable and are able to be deleted by authorized users in an embodiment. Although the note tool 308 may be a separate component from the other tools in the system, the note tool 308 may be integrated within one or more other tools (e.g. viewer tool, script tool, etc.).

The production tracking tool 106 may also include a location tool 310 as shown in FIG. 7. The location tool 310 may provide information for all the desired locations where the motion picture may be shot, whereby the locations may be indoor or outdoor areas. The location tool 310 may be linked up with the script tool 102 to allow the user to set and/or view the location where the portion of the script should be shot. The location tool 310 may be linked to the personnel/contact tool 306 and tasks tool 304 to assign and organize the persons who will be present at the particular location. The location tool 310 may be linked to the note tool 308 to provide notes and/or additional information of the locations. The location tool 310 may have a field to allow the user to insert the cost of using the location for a desired amount of time, whereby the location tool 310 may be linked to the budget tool 116 and may update the budget accordingly.

The budget tool 116 referred to above allows authorized persons in the production team to manage and edit budgeting of the particular project or sub-projects. The budget tool 116 may provide accounting as well as analysis of the budget for the project or sub-projects as well a track and analyze invoice details. The budget tool 116 may include any other features which are found in accounting software programs.

Figure 8:
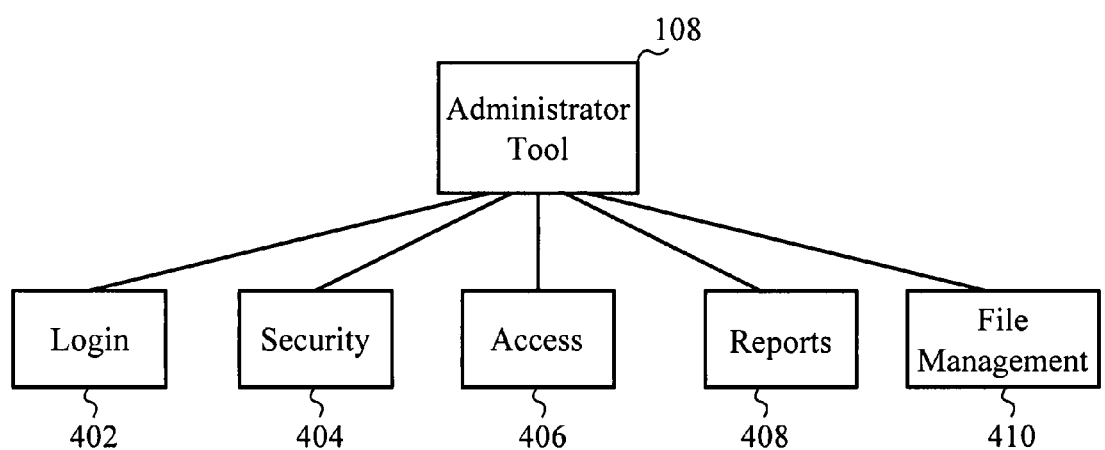
FIG. 8 illustrates a block diagram of an administrator tool of the system in accordance with an embodiment.

FIG. 8 illustrates a block diagram of the administrator tool of the system in accordance with an embodiment. The administrator tool 108 provides all the administrative functions which are used to create and maintain user accounts and logins (block 402), set up and manage security (block 404) and access (block 406), generate reports (block 408) and manage files (block 410). The administrator tool 108 is run by the administrator who has sole internal rights and access to the server 204 (FIG. 2). The administrator tool 108 allows the administrator to modify, add, and delete user groups. Within each user group, the administrator may also add or remove individual users. The administrator tool 108 allows the creation and modification of levels of access of each user.

The administrator tool 108 also provides access to reporting features of the system 100, whereby the reporting feature allows convenient access for management staff to track the progress, efficiencies, and status check for the system, as necessary. The reporting feature may include, but is not limited to, a daily operation reports, custom system report, workload reports, employee reports, accounting reports, past due tasks reports, cost/budget reports, and production reports.

The administrator tool 108 allows for file management rights in the system. The administrator tool 108 allows the administrator to set and grant uploading and downloading rights to appropriate individuals as well as monitor (and limit) the amount of uploading and downloading permitted by the system 100. The administrator tool 108 tracks movement of all files in the system 100 as well as corrects any problems associated with file management.

While embodiments and applications of the system have been shown and described, it would be apparent to those skilled in the art having the benefit of this disclosure that many more modifications than mentioned above are possible without departing from the inventive concepts herein.

What is claimed is:

1. A method for producing a motion picture via a collaboration system, the method comprising:
creating a plurality of content bins, wherein the content bins are selectively organized to coincide with a script outline upon which the motion picture is at least partially based;
storing a plurality of first digital media files in a memory;
storing a plurality of second digital media files in the memory;
designating the first digital media files to a first content bin, the first content bin is associated with a first part of the script outline, wherein the first digital media files each contain uploaded content associated with the first part of the script outline;
designating the second digital media files to a second content bin, the second content bin is associated with a second part of the script outline, wherein the second digital media files each contain uploaded content associated with the second part of the script outline;
automatically displaying the first digital media files upon selection of the first content bin, wherein the first digital media files are playable to view their associated uploaded content upon being selected by the user;
automatically displaying the second digital media file upon selection of the second content bin, wherein the second digital media files are playable to view their associated uploaded content upon being selected by the user; and
wherein the first and second digital media files each include a video component according to a script, the method further comprising playing the first and second digital media files simultaneously, wherein the video components are automatically synchronized with respect to time according to the script.

2. The method of claim 1, further comprising uploading a text corresponding to at least one of the first or second digital media files, wherein the text is viewable by one or more selected users.

3. The method of claim 1, further comprising tracking versions of the first and second digital media files, wherein the first and second digital media files are capable of being played based on selected versions.

4. The method of claim 1, further comprising: linking profile information to the digital media file, wherein the profile information is automatically displayed and accessible upon display of the digital media file.

5. The method of claim 1, wherein the first and second content bins are moveably organizable with respect to one another in the script outline such that the corresponding first and second digital media files are moveable along with the first and second content bins.

6. The method of claim 1, wherein one or more of the content bins correspond with one or more scenes, slates, shots or takes.

7. The method of claim 1, further comprising: linking a portion of the script outline to correspond to the first digital media file; and automatically navigating a user to the first digital media file upon selection of the linked portion of the script outline.

8. The method of claim 7, wherein the first digital media files includes a video component and an audio component, the method further comprising: requesting the user to select the video or audio component; and playing the selected component corresponding to the linked portion of the script outline.

9. The method of claim 1, further comprising:
uploading a third digital media file;
organizing the first, second and third content bins in a desired order;
selecting a digital media file in each of the first, second and third content bins;
playing the selected digital media files, wherein said selected digital media files are played automatically in the desired order.

* * * * *